Aug. 25, 1964   R. H. KOLB ETAL   3,145,683
SHIP CONTROL SYSTEM

Filed Aug. 22, 1961   2 Sheets-Sheet 1

INVENTORS:
H. L. SHATTO, JR.
R. H. KOLB

BY: *Theodore E. Bieber*
THEIR ATTORNEY

INVENTORS:
H. L. SHATTO, JR.
R. H. KOLB

BY: Theodore E. Bieber

THEIR ATTORNEY

United States Patent Office 3,145,683
Patented Aug. 25, 1964

3,145,683
SHIP CONTROL SYSTEM
Robert H. Kolb, Houston, Tex., and Howard L. Shatto, Jr., Palos Verdes, Calif., assignors to Shell Oil Company, New York, N.Y., a corporation of Delaware
Filed Aug. 22, 1961, Ser. No. 133,119
3 Claims. (Cl. 114—144)

This invention pertains to a novel device or system to anchor a vessel dynamically over a particular location on the floor of a body of water and to provide the vessel with a high degree of maneuverability.

In offshore drilling operations it is desirable to be able to drill from a floating vessel which is merely maintained over the spot on the ocean floor and is not required to be anchored or otherwise fastened to the ocean floor. In the past, it has been the practice to either erect a tower over the desired location and drill from a fixed platform on the tower or anchor a floating vessel over the spot and drill from the anchored vessel. In either case, the drilling platform or vessel has been attached to or anchored to the ocean floor in order to maintain it in a fixed location. While these methods are satisfactory they have several disadvantages. For example, the use of a fixed tower is limited to rather shallow depths while the use of an anchored vessel requires the placement of suitable anchores in a plurality of directions to maintain the vessel in position. The placement of these anchors requires a considerable amount of time which greatly increases the cost of drilling and is, of course, impossible in deep water.

In addition to drilling vessels may other vessels must be maintained over a fixed spot or maneuvered in narrow channels. For example, oceanographic, weather, salvage and radar vessels must be maintained in fixed locations. Similarly, fire boats and tugboats must be maneuvered in limited areas. Thus, while this invention is described below as applied to a drilling vessel, it can be used to anchor dynamically any vessel or to maneuver any type of vessel.

The high cost of the prior methods of operation could be avoided if it were possible to maintain a floating vessel over the desired drilling spot without the use of anchors or other fastening means. In such an operation, it would only be necessary to move the drilling vessel to the desired location and hold it in position while the drilling operation is performed and then move on to the next spot. Such an operation would have considerable advantage especially during the early stages of offshore operations when only shallow core wells are to be drilled.

Accordingly, it is the principal object of this invention to provide a vessel having a plurality of propulsion units with an automatic system for varying the thrust and direction of thrust of the propulsion units to maintain the floating vessel over a desired position.

A still further object of the present invention is to provide a unique control system for controlling the magnitude of the trust and the direction of thrust of a plurality of propulsion units displaced from the center of rotation of a vessel to maintain the vessel over a desired position. The control system utilizes information indicating the horizontal displacement of the vessel from the desired position as well as the rotational compass heading the vessel to compare with the desired heading to provide electrical signals for controlling the magnitude of the thrust and the direction of the thrust of the propulsion units. The electrical signals are vectorially resolved in a circuit to obtain command signals for each propulsion unit to control the thrust and direction of thrust of each unit.

A still further object of this invention is to provide a novel control system for controlling the magnitude of the thrust and direction of the thrust of a plurality of propulsion units displaced from the center of rotation of the vessel to maintain the vessel over a desired position to maneuver the vessel along a desired course. The control system utilizes electrical signals representing the displacement of the vessel from the desired position as well as the compass heading of the vessel and then vectorially resolves these signals to obtain a resultant horizontal thrust vector for each propulsion unit and to modify the individual thrust vector of each propulsion unit by the vector addition of rotational vectors substantially tangential to the circumference of a circle drawn through each propulsion unit about the center of rotation of the vessel.

A still further object of this invention is to provide a vector resolving unit that accepts command signals from automatic controllers that indicate the desired movement of a vessel in two directions at an angle to each other and the desired rotation of a vessel.

The above objects and advantages of this invention are achieved by providing multiple propulsion units mounted on a vessel and displaced from its center of rotation. Each propulsion unit is provided with a means for varying the magnitude of its thrust as well as the direction of the thrust in much the same manner as one varies the magnitude or direction of thrust of an outboard motor. A means is provided for determining the horizontal or angular displacement of the vessel from its desired location, such as the use of visual or electronic inspection of reference points, mechanical or electrical measurements of displacement from a desired location, and a compass heading. These position signals are compared either manually or by automatic controllers with the desired position, and corrective command signals are sent to the vector resolving unit. The vector resolving unit provides gang operation of the propulation units to provide parallel thrust vectors to obtain a resultant horizontal thrust vector and to modify the individual thrust vector of each propulsion unit by vector addition of a rotational vector.

In order to prevent the control system from signaling frequent radical changes in the direction of the thrust of the propulsion units when the propulsion units are operating at near-zero magnitude of thrust, it is desireable to provide a differential bias system which results in a bias vector for each propulsion unit, the vector sum of all the individual bias vectors being equal to zero.

From this description, it is clear that the control system of this invention permits most efficient use of the propulsion units with minimum interference between various desired corrective actions. For example, the vessel may be rotated about its rotational axis without requiring additional corrective actions to eliminate the erroneous interjection of lateral displacement vectors. Similarly, the vessel may be moved laterally without requiring corrective action to prevent rotation.

The above objects and advantages of this invention will be more easily understood from the following detailed description when taken in conjunction with the attached drawings, in which.

In a copending application of H. L. Shatto, Jr. and J. R. Dozier, entitled, "Ship Control System," Serial No. 95,601, filed March 14, 1961, there is disclosed and claimed a method and apparatus for positioning a ship by first determining the horizontal and rotational displacement of the ship from a desired position and then vectorially resolving these displacements to obtain a command signal for each of a plurality of propulsion units. In this copending application, the rectangular coordinate control signals are vectorially resolved to polar coordinates by an electro-mechanical system to provide the command signals for the individual propulsion units. In contrast the present invention is directed to an electrical system for vectorially resolving the rectangular coordinate control signals to obtain the required polar command signals.

Figure 1:
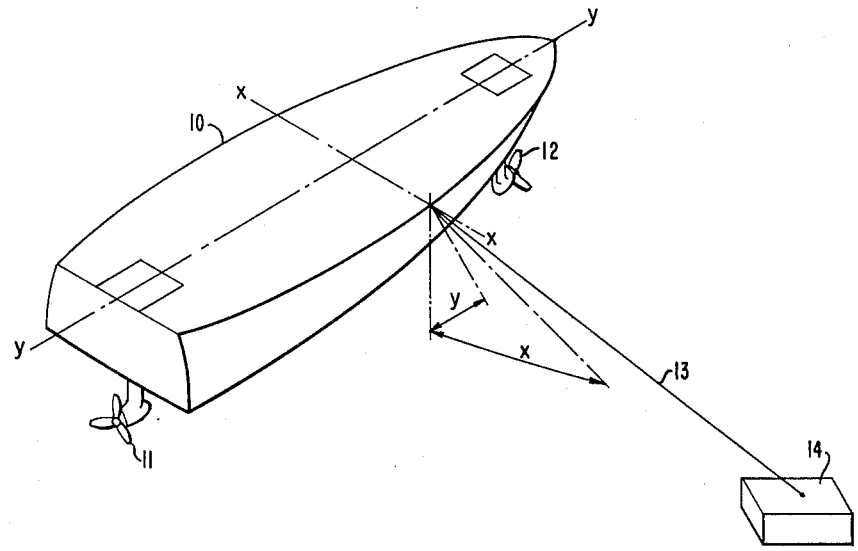
FIGURE 1 is a schematic representation showing the location of the two propulsion units on the floating vessel and a means for determining its displacement from a desired position.

Referring to FIGURE 1, there is shown a vessel 10 having a propulsion unit 11 located at its stern and a second propulsion unit 12 located at its bow. The two propulsion units are located along the center axis of the vessel 10 and rotate about a vertical axis intersecting this axis. Each of the propulsion units is provided with a means for individually varying their direction of thrust as well as the magnitude of their thrust. Suitable units are electrically driven outboard motor type units in which the speed of rotation of the propellers may be varied to vary the thrust supplied and the complete unit rotated about a vertical axis to vary the direction of thrust.

Also shown in FIGURE 1 is a method for utilizing a taut guide line 13 to determine the displacement of the vessel from its desired location. The guide line 13 is connected to the vessel 10 at its upper end and to an anchor 14 at its lower end with the anchor 14 being disposed at the desired location of the vessel. The angular deflection of the guide line is measured in two vertical planes at right angles to each other as indicated by the angles $x$ and $y$ in FIGURE 1. The deflection of the guide line may be measured by various means, for example, a pair of potentiometers disposed at right angles to each other and operated by a gimble-mounted pendulum. A tiltmeter suitable for measuring the angular deflection of a taut line is disclosed and claimed in a copending application of Kenneth W. Foster, Serial No. 860,504, filed July 30, 1959, now Patent No. 3,121,954.

In addition to measuring the angular displacement of the vessel from its desired location, the compass heading of the vessel is determined. This, of course, may be accomplished by any known type of compass but preferably a gyrocompass is used which provides an electrical signal related to the compass heading.

Figure 2:
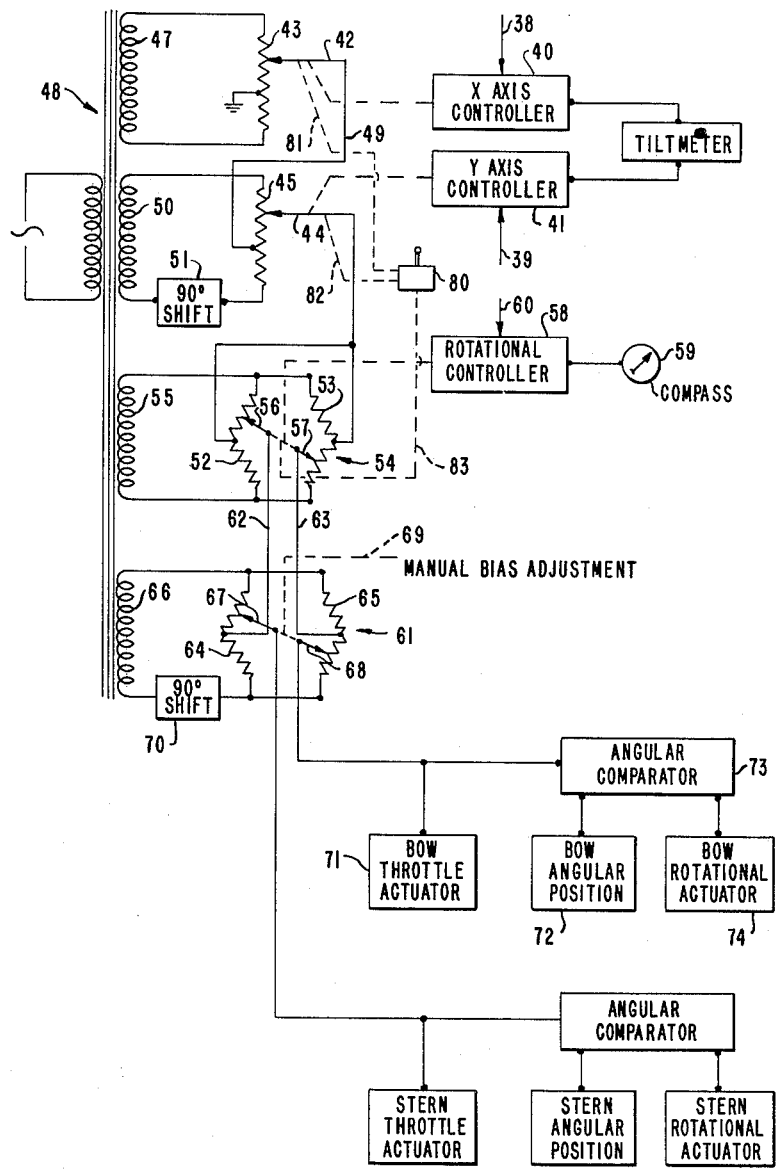
FIGURE 2 is a block diagram illustrating one embodiment of the control system of this invention; and, FIGURE 3 is a vector diagram illustrating the vector resolving unit for the bow and stern propulsion units.

Referring now to FIGURE 2, there is shown a schematic arrangement for vectorially combining the measurements of FIGURE 1. It is assumed that the vessel 10 is to be positioned over the anchor 14 on a particular compass heading. As explained above, the heading of the vessel is measured by a gyrocompass while the deviation of a taut line stretched between the vessel 10 and anchor 14 is measured in two vertical planes at an angle to each other, preferably at right angles.

The stern propulsion unit 11 is provided with a throttle actuating mechanism 30, a directional actuating mechanism 31 and a means 32 for determining its angular position with relation to the fore and aft axis of the vessel. The bow propulsion units are provided with a similar throttle actuator 33, directional actuator 34 and angular position transmitting means 35.

The signals from the two potentiometers of the tiltmeter are supplied to two controllers 40 and 41. Each of the controllers receives a separate signal from one of the tiltmeter potentiometers and supplies an output signal indicating the total net lateral and longitudinal thrust, respectively, that is required to move the vessel back to its desired position. The controllers can be commercially available controllers that have in addition to set point adjustments indicated by arrows 38 and 39, conventional control response adjustments such as proportional, reset and derivative actions. The controller 40 receives the signal from the potentiometer of the tiltmeter that is aligned with the $x$ axis of FIGURE 1 while the controller 41 receives the signal from the potentiometer of the tiltmeter that is aligned with the $y$ axis. The controller 40 positions the wiper arm 42 of a potentiometer 43 while the controller 41 positions the wiper arm 44 of a potentiometer 45. The potentiometer 43 has a grounded center tap and is coupled to one secondary 47 of a power transformer 48. The power transformer 48 is coupled to a suitable source of alternating circuit, as for example a normal 60-cycle power supply. The wiper arm 42 is coupled by means of a lead 49 to the center tap on the potentiometer 45. The potentiometer 45 is coupled to an additional secondary 50 on the power transformer 48 by a circuit that includes a phase shifting network 51 capable of shifting the power supply 90 electrical degrees.

The above-described circuit will vectorially add two signals that represent the lateral and longitudinal thrust components necessary to restore the vessel to the set position. The signals are obtained by supplying the tiltmeter output signals to controllers that compare the actual position of the vessel with the desired position. The controllers then position the wiper arms of the two potentiometers 43 and 45 in proportion to the thrust required of the two propulsion units along the $x$ and $y$ axis to move the vessel back to the desired position or to maintain the position. The reset action of the controllers 40 and 41 will position the wiper arms 42 and 44 of the potentiometers to maintain the vessel in the desired position against the force of wave action or wind. The reset action of the controllers will position the potentiometers under these conditions even though the tiltmeter indicates the vessel is in the desired position. The use of the 90 degree phase shifting network 51 in the power supply from the potentiometer 45 provides a means whereby the signals from the potentiometer 45 are shifted 90 degrees from the signals from the potentiometer 43. Since the two potentiometers are connected in series the two signals will thus be vectorially added. The two potentiometers 43 and 45 form a vector resolving unit.

The wiper arm 44 is coupled to the center tap on two potentiometers 52 and 53 which form a rotational vector resolving circuit 54. The two potentiometers 52 and 53 are coupled in parallel and to a secondary 55 on a power transformer 48. The wiper arms 56 and 57 of the potentiometers 52 and 53, respectively, are positioned by a controller 58. The controller 58 receives an input signal from a compass 59 and compares it with the set point adjustment 60 that indicates the desired heading of the vessel. The controller 58 is similar in design and construction to the controllers 40 and 41 described above. The controller 58 positions the two wiper arms 56 and 57 in equal amounts and in opposite directions of the center points of the two potentiometers 52 and 53 in response to the difference between the actual heading of the ship and its desired heading.

The rotational circuit 54 described above will vectorially add a rotational vector to the sum of the two vectors from the previous circuit and subtract the rotational vector from the same sum to supply separate signals for each propulsion unit. The rotational vector added and subtracted by the resolving unit 54 will be directed along the $x$ axis since the potentiometers are coupled directly to the power transformer secondary 55. Equal and opposite thrust vectors along the $x$ axis provides the most efficient rotation of the vessel. The magnitude of the signal on the wiper arm 56 will indicate the required thrust of the bow propulsion unit while the difference in phase between this signal and the signal representing the angular position of the bow propulsion unit will indicate the required rotation of the bow propulsion unit. In a similar manner, the signal 57 will represent the required thrust and rotational position of the stern propulsion unit.

While it is possible to utilize the signals appearing on the wiper arms 56 and 57 to control bow and stern propulsion units it is preferable to add a slight biasing effect to these signals to prevent frequent rotation of the propulsion units as the vessel oscillates over its desired location in a calm sea with no wind. These biasing vectors are preferably of equal and opposite magnitude and directed along the $y$ axis. They may easily be supplied by utilizing a second resolving circuit 61 identical to the rotational circuit 54 described above. Wiper arms 56 and 57 are connected by means of leads 62 and 63 to the center tap of two additional potentiometers 64 and 65 forming the bias vector resolving circuit 61. The additional potentiometers are coupled to an additional secondary 66 located on the power transformer 48. The wiper arms 67 and 68 of the two additional potentiometers are displaced equal and opposite amounts from the center tap positions by a manual adjustment means 69. Since the biasing effect is added in a direction that parallels the $y$ axis of the vessel the potentiometers are coupled to the secondary 61 through a phase shifting network 70 that shifts the power supply 90 electrical degrees.

The signal from the wiper arm 68 of the additional potentiometer 65 represents the signal for the bow propulsion unit. The magnitude of this signal can be used to control the bow throttle actuator 71 directly while the angular difference between the phase of this signal and the angular position of the bow propulsion unit as determined by the bow angular position transducer 72 is determined in an angular comparing unit 73. The angular comparing unit 73 compares a signal representing the position of the bow propulsion unit with the signal from the resolving unit 61 and supplies an output signal to the rotational actuator 74 of the bow propulsion unit. In a similar manner the signal appearing on the wiper arm 67 is utilized to control the thrust and rotational position of the stern propulsion unit.

Figure 3:
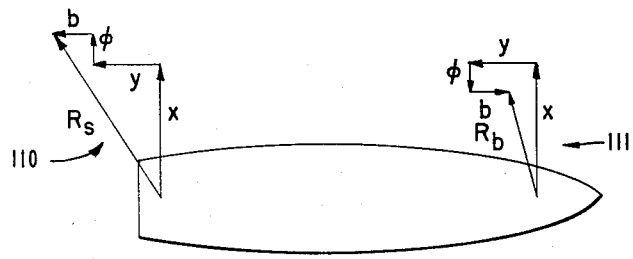

The operation of the complete system can be better understood by referring to FIGURE 3 where the vector diagram 110 illustrates the vector addition for the stern propulsion unit and the diagram 111 illustrates the vector addition for the bow propulsion unit. In the diagrams 110 and 111, $x$ represents the thrust vector required to restore or maintain the vessel position in the $x$ plane of FIGURE 1 which is parallel with the athwart direction of the vessel, while $y$ represents the vector required to restore or maintain the vessel position in the fore and aft direction. The vectors $\phi$ represent the rotational thrust required to maintain the vessel 10 at the desired heading and are directed in the $x$ direction and vectors $b$ represent the biasing effect described above and are directed in the $y$ direction.

The $x$ and $y$ vectors that represent the control signals in the $x$ and $y$ planes are added in both diagrams. This operation is performed by the displacement vector resolving circuit of FIGURE 2 that supplies an output signal equal to the vector sum $x$ and $y$. Next the rotational vector $\phi$ is added in one direction in diagram 110 and in the opposite direction in diagram 111. This operation is performed by the rotational vector resolving circuit 54 which both adds and subtracts an electrical signal proportional to the rotational vector $\phi$ to the signal from displacement circuit 54. The two signals resulting from the adding and subtracting of the rotational vector $\phi$ appear on the wiper arms 56 and 57 of FIGURE 2. Of course, the rotational vectors $\phi$ represent the thrust required, at right angles to the longitudinal axis of the vessel, to rotate the vessel back to its desired heading. The bias vectors $b$ are added in the diagram 110 and subtracted in diagram 111 in the same manner as the rotational vectors $\phi$. This operation is performed by the bias vector resolving circuit 61 which is similar to rotational circuit 34 with the wiper arms being manually positioned. Since the bias vectors are directed in opposite directions they insure that the system will not signal for frequent changes in the direction of the propulsion units as the vessel oscillates over the desired position during periods when external biasing forces are absent.

The resulting vectors $R_s$ and $R_b$ of diagrams 110 and 111 represent the required thrust and direction of each propulsion unit 11 and 12, respectively. These thrust vectors provide for the most efficient use of the thrust of the propulsion units in returning the vessel to its desired position.

In the above description the various portions of the vector resolving circuit were coupled directly to the succeeding unit to simplify the description. In actual practice it is necessary to isolate the various units by the use of transformers or buffer amplifier circuits. The construction and use of these devices are well known to those skilled in the art.

In many applications it is desirable to include a manual control means for maneuvering the vessel. A manual control can be provided by disconnecting the controllers 40, 41 and 58 and positioning the potentiometers 43, 45, 52 and 53 manually. Control handle 80 and connections 81, 82 and 83 schematically illustrate such a system. The control handle should be designed so that it can be rotated to position potentiometers 52 and 53 without moving the potentiometers 43 and 45. Similarly, the control handle should be capable of positioning the potentiometers 43 and 45 either individually or jointly without moving potentiometers 52 and 53. Of course, the control handle should also position all of the potentiometers 43, 45, 52 and 53 jointly.

Also while the above system is described with reference to the use of two propulsion units it can be expanded to handle any number of units. To handle additional propulsion units, additional vector resolving units can be utilized to provide the signals for controlling the additional units.

While but one specific embodiment of this invention has been described in detail it is susceptible to many modifications and changes. For example, other circuits than the potentiometer circuits described above such as the synchronous induction devices known to the art may be designed for vectorially adding various electrical signals. The important features of this invention are the use of electrical circuits to vectorially add the various electrical signals. Accordingly, this invention should not be limited to the details described herein but only to the broad spirit and scope thereof.

We claim as our invention:

1. A system for positioning a floating vessel over a desired location comprising: propulsion means located at the bow and stern of said vessel, each of said propulsion means having a variable thrust and a variable direction of thrust, tiltmeter means disposed to determine in two planes at an angle to each other the angular deflection of an axis passing from the vessel through the desired location, said tiltmeter means supplying separate electrical signals proportional to each of the determined angles, a controller means coupled to the tiltmeter to receive the two separate electrical signals; a first circuit means coupled to said controller means for vectorially adding said separate electrical signals and supplying an output signal proportional to the vector sum of said separate signals; compass means disposed on the vessel for determining the heading of the vessel and supplying an electrical signal related to said heading, a compass controller means coupled to said compass means to provide a signal to restore the vessel to the desired heading, a second circuit means coupled to said compass controller means and to said first circuit means to vectorially add the compass controller output signal to the output signal of said first circuit means and supply a first control signal proportional thereto, a said second circuit means in addition vectorially subtracting the compass controller output signal from the output signal of said first circuit and supply a second control signal proportional thereto; said second circuit means being coupled to a third circuit means, said third circuit means including a means for generating a signal representing the desired biasing of the system, said third circuit means adding said biasing signal to said first control signal and subtracting the biasing signal from said second control signal to supply first and second command signals representing for each propulsion unit the required thrust and thrust direction to return said vessel to its desired location and actuating means disposed on said bow and stern propulsion unit for controlling the thrust and its direction, the bow actuating means being responsive to said first command signal and the stern actuating means being responsive to the second command signal.

2. A system for positioning a floating vessel over a desired location comprising: propulsion means located at the bow and stern of said vessel, each of said propulsion means having a variable thrust and a variable direction of thrust; position sensing means disposed to determine the lateral movement of the vessel in two directions required to return the vessel to the desired positions and generate two related electrical signals; a first circuit means coupled through controllers to said position sensing means for vectorially adding said two related electrical signals and supplying an output signal proportional to the vector sum of said separate signals; compass means disposed on the vessel for determining the heading of the vessel and supply a related electrical compas signal; a second circuit means coupled through a controller to said compass and to said first circuit means to vectorially add the electrical compass signal to the output signal of said first circuit means and supply a first control signal proportional thereto, said second circuit means in addition vectorially subtracting the electrical compass signal from the output signal of said first circuit and supplying a second control signal proportional thereto; a third circuit means coupled to said second circuit means, said third circuit means including a means for generating a signal representing the desired biasing of the system, said third circuit means adding said biasing signal to said one control signal and subtracting the biasing signal from said second control signal to supply first and second command signals representing for each propulsion unit the required thrust and thrust direction to return said vessel to its desired location and actuating means disposed on said bow and stern propulsion unit for controlling the thrust and its direction, the bow actuating means being responsive to said first command signal and the stern actuating means being repsonsive to the second command signal.

3. A control system for a vessel having a plurality of thrust units disposed on said vessel at locations displaced from the center of rotation of said vessel, said control system comprising: displacement detecting means disposed on said vessel to determine the lateral displacement of said vessel from its desired position in two different directions, and supply electrical displacement signals related thereto; first and second controller means coupled to said displacement detecting means for comparing said electrical displacement signals with preset conditions and supply first and second displacement control signals; a displacement vector revolving circuit coupled to said first and second controller means for vectorially adding said first and second displacement control signals to obtain a displacement signal; a compass means disposed on said vessel to determine the heading thereof and supply an electrical signal related thereto, a compass controller coupled to the electrical signal related to the compass means and disposed to compare the compass heading with the desired heading of the vessel and supply a rotational control signal; a rotational vector resolving circuit coupled to said compass controller and said displacement vector resolving circuit to vectorially add and subtract said rotational control signal from said displacement signal to obtain first and second error signals and circuit means for utilizing said first and second error signals to control the propulsion units of said vessel.

References Cited in the file of this patent

UNITED STATES PATENTS

| 2,597,789 | McGoldrick | May 20, 1952 |
| 2,650,046 | Vanderlip | Aug. 25, 1953 |
| 2,806,441 | Hoke | Sept. 17, 1957 |
| 2,873,075 | Mooers et al. | Feb. 10, 1959 |
| 2,987,027 | Wanzer | June 6, 1961 |
| 2,998,210 | Carter | Aug. 29, 1961 |